March 3, 1964     H. E. MARSHALL     3,123,052
DOG LEASH WITH AUTOMATIC TENSION AND REWIND
Filed Oct. 15, 1962
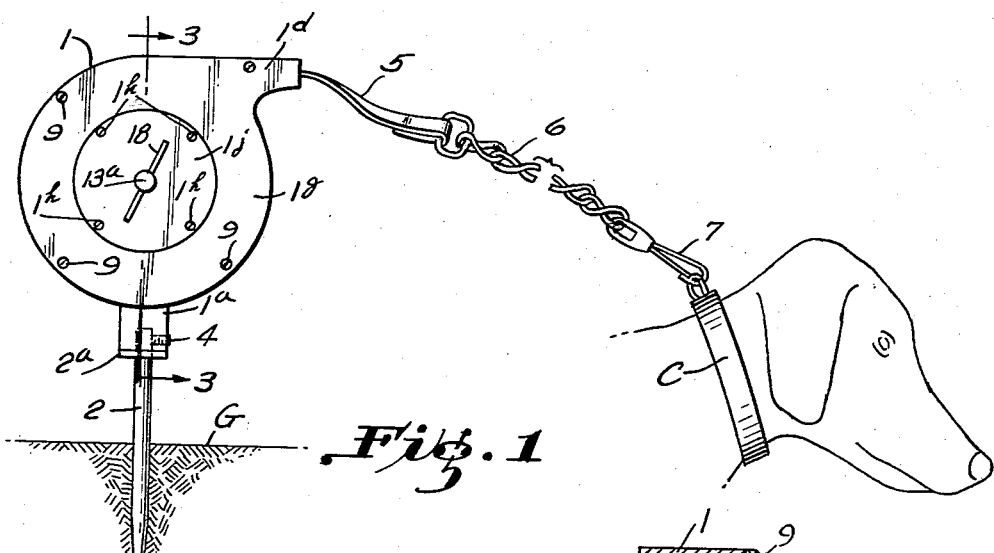
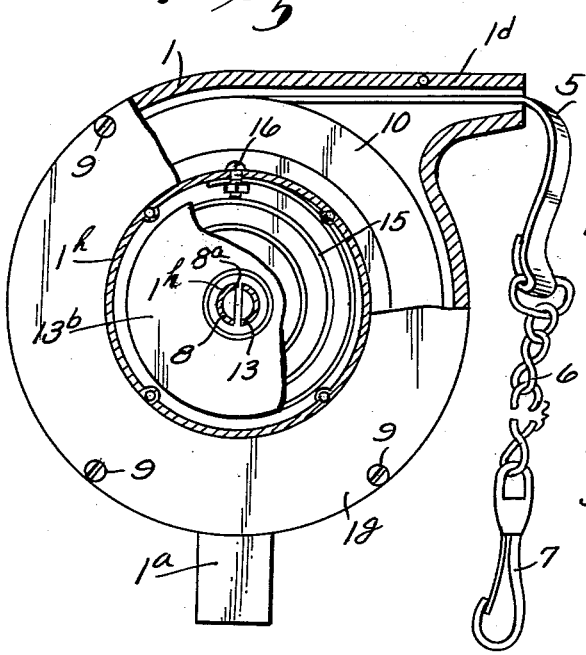
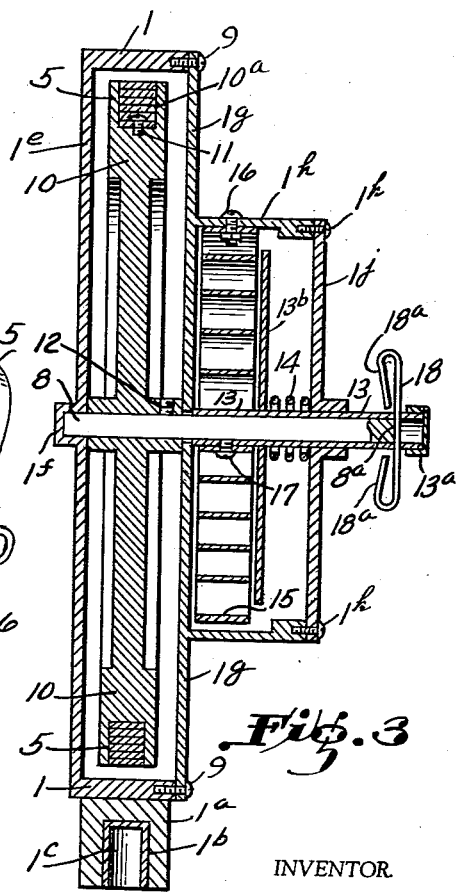
INVENTOR.
HAROLD E. MARSHALL
BY 3,123,052
DOG LEASH WITH AUTOMATIC TENSION
AND REWIND
Harold E. Marshall, Rte. 1, Box 24, Kimball, Nebr.
Filed Oct. 15, 1962, Ser. No. 230,619
6 Claims. (Cl. 119—124)

This invention is a novel improvement in leashes for dogs or other pets or the like, same having automatic tensioning and rewinding devices; and the principal objects of the invention are to provide a dog leash of the above type consisting of a casing which houses a reel which is spring-biased and upon which is wound or unwound the leash which is attached to the dog's collar, said reel normally retracting the leash, with means for manually adjusting the tension of the reel biasing spring to regulate same according to the strength of the dog or other animal to which the leash is attached; said reel casing being swivelly mounted upon a stake or the like which may be set in the ground or attached to a fixed support so that the casing may swivel freely on the stake to maintain the leash at all times in alignment with the dog or other animal, and so that the leash when in use is at all times facing the direction in which the leash is pulled by the animal as the latter moves away from, or returns towards, the stake, the leash rewinding automatically onto the reel.

Another object of the invention is to provide a spring tensioning device for the leash which can be manually set for any desired tension in accordance with different strengths of animals or the like to which the leash is attached.

I will explain the invention with reference to the accompanying drawing which illustrates one practical embodiment thereof to enable others familiar with the art to adopt and use the same, and will summarize in the claims the novel features of construction and novel combinations of parts, for which protection is desired.

In said drawing:

FIG. 1 is a side elevation of my novel leash showing same swivelled upon a stake set in the ground, and showing same attached to a dog collar.

FIG. 2 is an enlarged elevation of the casing partly broken away to show the underlying parts.

FIG. 3 is an enlarged vertical section through the casing on the line 3—3, FIG. 1.

In said drawing, the casing 1 which houses the leash reel and the tensioning and rewinding devices, is shown as swivelly mounted upon a stake 2 driven into the ground G, the stake 2 having an annular flange 2a adjacent its upper end upon which the base extension 1a of the casing 1 seats, the extension 1a having a recess 1b (FIG. 3) in its lower end in which may be fitted a bushing 1c, the extension 1a being retained upon the annular flange 2a by means of an Allen head screw 4, the inner end of which fits into an annular groove in the upper end of stake 2 above the flange 2a, thereby preventing separation of the extension 1a from the stake but permitting the casing 1 to freely swivel on the stake.

In FIG. 1 the stake is shown as being straight, however, if desired the stake may be helical below the flange 2a, or the lower end of the stake may in fact comprise an inverted U-clamp, one leg of which carries a thumb screw so that the same may be readily secured to a fixed support rather than engaged in the ground. The particular form of the stake forms no part of my present invention provided the upper end thereof is provided with the annular flange 2a upon which the base extension 1a normally seats.

As shown, the casing 1 is substantially circular in plan and is provided with a substantially tangential lateral extension 1d at its upper portion which extension is open at its outer end and through which projects the leash 5 which may be connected to a short length of chain 6 or the like having a snap 7 of conventional form adapted to be snapped into an eye in the collar C disposed around the neck of the dog or other animal.

As shown in FIG. 3, the peripheral wall of the casing 1 is formed integrally with a back wall 1e at the center of which is a recessed offset bearing portion 1f adapted to receive the adjacent end of a shaft 8 hereinafter referred to, while the opposite wall 1g of the casing 1 is a removable plate which is secured to the peripheral portion of the casing 1 by screws 9 or the like as shown in FIG. 3, said removable wall 1g having a central opening therethrough for the shaft 8 which extends beyond the outer face of the wall 1g as shown.

Within the casing 1 between the walls 1e—1g is a reel 10 consisting of a wheel having in its periphery a groove 10a adapted to receive the coils of the wound leash 5 as shown in FIG. 3, the inner end of the innermost coil of the leash 5 being secured to the base of the peripheral groove 10a by a screw 11 or the like as shown in FIG. 3, so as to limit the length of the leash 5 which may be unwound from reel 10.

As shown the reel 10 is fixedly mounted upon the shaft 8 by means of a screw 12, FIG. 3, or the like, but may be fixedly secured thereto in any other desired manner so that the reel 10 will rotate with the shaft 8.

Means are provided for constantly urging the reel 10 to rewind the leash 5. As shown on the outer face of the removable wall 1g is a hollow cylindrical housing 1h through which the shaft 8 passes, said housing 1h being closed at its outer end by a removable cover 1j having a bearing 1k through which the shaft 8 also passes, the shaft 8 extending beyond the cover plate 1j as shown in FIG. 3. The cover plate 1j is secured to the periphery of the housing 1h by screws 1k as shown.

Within the housing 1h around the shaft 8 is a sleeve 13 having its inner end abutting against the wall 1g and its outer end passing through the bearing 1k in the cover plate 1j and projecting beyond said cover plate, the outer end of the sleeve 13 being normally closed by a cap 13a. The sleeve 13 is provided with a flange or disk 13b, FIG. 3, and within the housing 1h interposed between the disk 13b of sleeve 13 and the inner face of the cover plate 1j is a coiled spring 14, FIG. 3, normally retracting the inner end of the sleeve 13 against the wall 1g.

Within the housing 1h disposed between the wall 1g and disk 13b of sleeve 13 is a relatively strong coiled rewind main spring 15 which has one end fixedly secured by bolt 16 or the like to the periphery of the housing 1h and its other end secured by screw 17 or the like to the sleeve 13 as shown in FIG. 3, thereby tending to maintain the sleeve 13 in fixed angular relation with respect to the casing 1 when the spring 15 is in normal relaxed condition.

The shaft 8 is freely rotatable in bearing 1f and within the sleeve 13, and in the outer end of the shaft 8 adjacent the outer end of sleeve 13 is a diametrical groove 8a, FIG. 2, adapted to be normally engaged by a cross-member 18 which passes through diametrically opposed holes in the sleeve 13 beyond the end of shaft 8, the same as shown having its ends looped back upon itself as at 18a to prevent separation of member 18 from the sleeve 13. Due to the action of the spring 14 the sleeve 13 is normally urged to the left, FIG. 3, so as to engage the diametrical groove 8a in the shaft 8, so as to cause the shaft 8 to rotate by and with the sleeve 13. However, when member 18 is pulled to the right (FIG. 3) the same will become disengaged from the groove 8a and thereby declutch the sleeve 13 from the shaft 8.

By the above construction, the tension on the leash 5 may be readily adjusted according to the strength of pull exerted by the animal or the like which is attached to the leash. For relatively strong animals the tension on the leash should necessarily be increased, this being accomplished by manually pulling outwardly on the cross-member 18 to disengage the same from the diametrical groove 8a in shaft 8, and then rotating the sleeve 13 while so pulled outwardly to partially tension the main rewind spring 15, whereupon releasing the pull on the member 18 will cause the member 18 to reengage the diametrical groove 8a in the end of shaft 8. Conversely, to decrease the desired tension on the leash 5 the member 18 would be pulled outwardly and simultaneously rotated in the reverse direction and then released so that the member 18 will again reengage the diametrical groove 8a of shaft 8 by action of the spring 14.

I have thus provided a dog leash with automatic tensioning and rewinding devices so constructed that when in use the leash 5 at all times will face the direction of pull on the leash so that as the animal moves away from or returns towards the stake 2 the leash will automatically unwind and rewind, the leash being normally in rewound position as shown in FIGS. 1 and 3. I have also provided manual means whereby the spring tension on the leash can be increased or decreased as desired according to the strength of the dog which is leashed, the same also applying to other pets or even children.

I do not limit my invention to the exact form shown in the drawing, for obviously changes may be made therein within the scope of the claims.

I claim:

1. A dog leash or the like, comprising a fixed support having a head; a casing mounted on said support for swivelling movement therearound and having a lateral opening therein; a spring-biased reel in said casing; a leash passing through said opening and normally encircling said reel and having its inner end secured thereto; the outer end of the leash being adapted to be secured to an animal or the like; said reel normally rewinding said leash; means in the casing for manually adjusting the tension of the reel biasing spring to regulate the strength thereof in accordance with the strength of the leashed animal; said casing having a substantially circular casing and being provided with side walls; an axially disposed shaft carrying said reel and being freely rotatable in a bearing in one side wall; a second bearing through which said shaft extends; a sleeve around said shaft passing through said second bearing and extending beyond the end of said shaft; a relatively strong coiled rewind spring having one end secured to said casing and its other end secured to said sleeve; and said adjusting means comprising a normally engaged clutch connecting said sleeve and shaft, said clutch being manually operable to release the sleeve from the shaft for independent rotation of the sleeve to vary the tension of the rewind spring.

2. In a dog leash as set forth in claim 1, means for urging the sleeve to maintain the clutch engaged; and said clutch comprising a cross-member transfixing the sleeve at the outer end of said shaft, said member normally engaging a diametrical groove in the end of the shaft, whereby an outward pull on the cross-member will release the sleeve from the shaft and permit adjustment of the tension of the rewind spring.

3. A dog leash or the like, comprising a fixed support having a head; a casing mounted on said support for swivelling movement therearound and having a lateral opening therein; a spring-biased reel in said casing; a leash passing through said opening and normally encircling said reel and having its inner end secured thereto; the outer end of the leash being adapted to be secured to an animal or the like; said reel normally rewinding said leash; means in the casing for manually adjusting the tension of the reel biasing spring to regulate the strength thereof in accordance with the strength of the leashed animal; said casing having a substantially circular periphery and being provided with side walls; an axially disposed shaft freely rotatable in a bearing in one side wall and passing through an opening in the other side wall; said reel being fixedly mounted on said shaft; an axially disposed housing mounted on said other side wall; a second bearing at the outer end of the housing through which said shaft extends; a sleeve around said shaft having its inner end normally engaging the said other side wall and passing through said second bearing and extending beyond the end of said shaft; a relatively strong coiled rewind spring in said housing having one end secured to said housing and its other end secured to said sleeve; and said adjusting means comprising a normally engaged clutch connecting said sleeve and shaft, said clutch being manually operable to release the sleeve from the shaft for separate rotation of the sleeve to vary the tension of the rewind spring.

4. In a dog leash as set forth in claim 3, a flange on said sleeve within the housing; a spring around the sleeve interposed between the flange and the second bearing for urging the sleeve towards the said other side wall of the casing and to maintain the clutch engaged; and said clutch comprising a cross-member transfixing the sleeve at the outer end of said shaft and normally engaging a diametrical groove in the end of the shaft, whereby an outward pull on the cross-member will release the sleeve from the shaft and permit independent rotation of the sleeve to adjust the tension of the rewind spring.

5. In a dog leash, a substantially circular casing provided with side walls; an axially disposed shaft freely rotatable in a bearing in one side wall and passing through an opening in the other side wall; a spring biased reel in said casing fixedly mounted on said shaft; a leash encircling said reel; an axially disposed housing mounted on said other side wall; a second bearing at the outer end of the housing through which said shaft extends; a sleeve around said shaft having its inner end normally engaging the said other side wall and passing through said second bearing and extending beyond the end of said shaft; a relatively strong coiled rewind spring in said housing having one end secured to said housing and its other end secured to said sleeve; and a normally engaged clutch connecting said sleeve and shaft, said clutch being manually operable to release the sleeve from the shaft for independent rotation of the sleeve to vary the tension of the rewind spring.

6. In a dog leash as set forth in claim 5, a flange on said sleeve within the housing; a spring around the sleeve interposed between the flange and the second bearing for urging the sleeve towards the said other side wall of the casing and to maintain the clutch engaged; and said clutch comprising a cross-member transfixing the sleeve at the outer end of said shaft and normally engaging a diametrical groove in the end of the shaft, whereby an outward pull on the cross-member will release the sleeve from the shaft and permit independent rotation of the sleeve to adjust the tension of the rewind spring.

References Cited in the file of this patent

UNITED STATES PATENTS

| | | |
|---|---|---|
| 66,417 | Thorn | July 2, 1867 |
| 2,437,786 | Oberdorf et al. | Mar. 16, 1948 |
| 3,088,438 | Oliphant | May 7, 1963 |